Patented Sept. 26, 1933

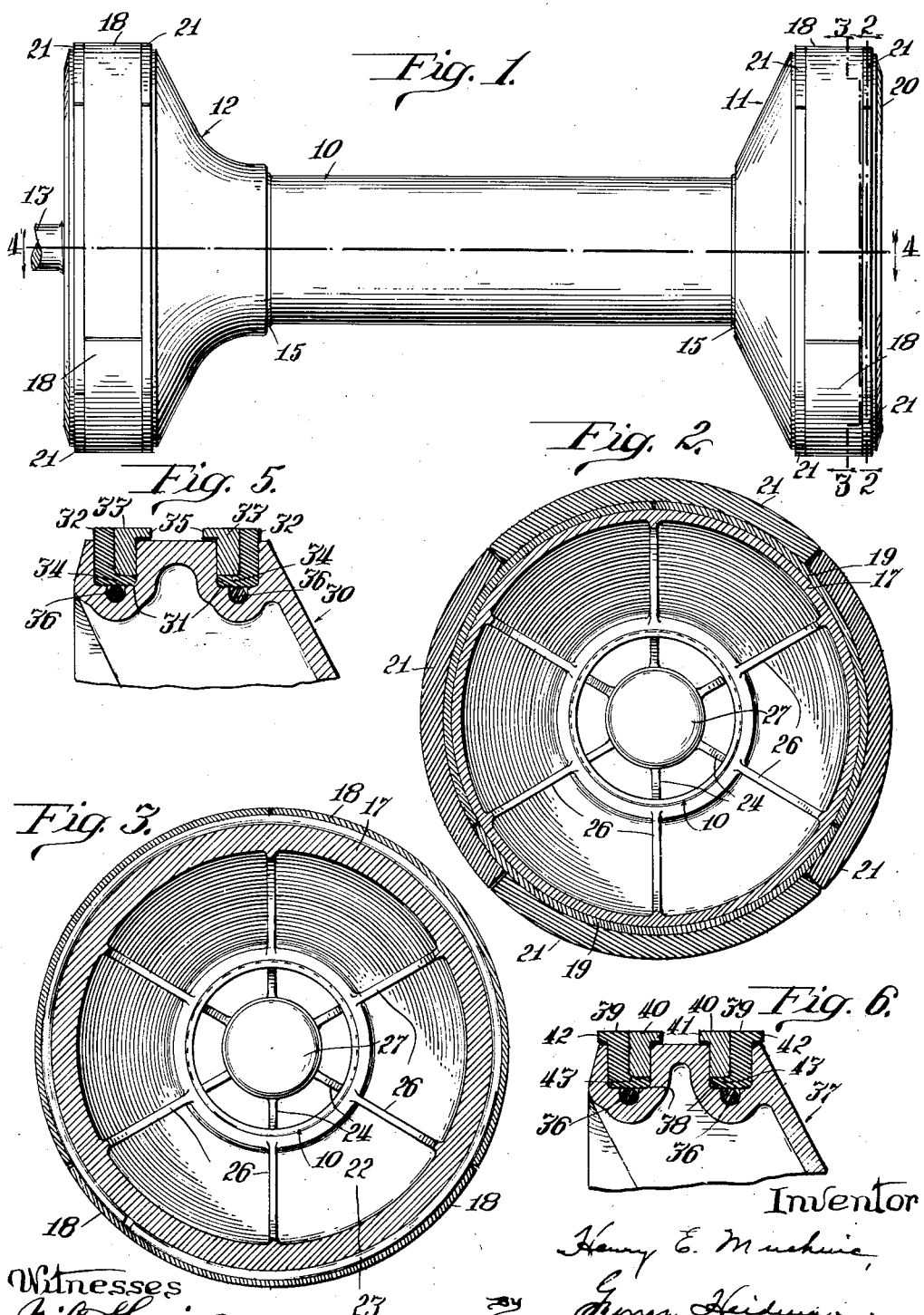

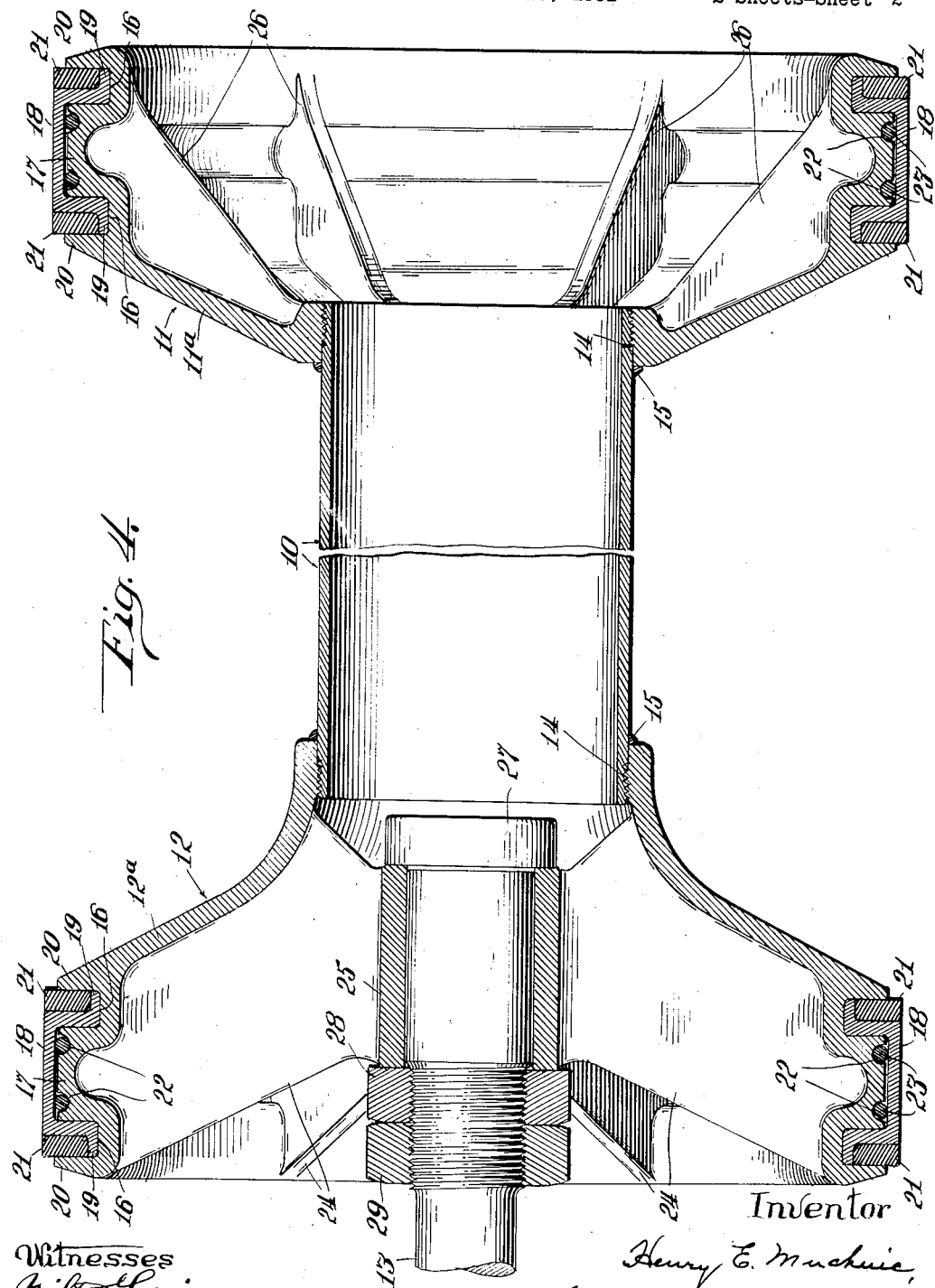

1,928,361

UNITED STATES PATENT OFFICE 1,928,361

PACKING

Henry E. Muchnic, Atchison, Kans., assignor to The Locomotive Finished Material Company, Atchison, Kans., a corporation of Kansas Application March 25, 1931. Serial No. 525,197

4 Claims. (Cl. 309—29)

My invention relates to valves more especially intended for distribution of steam to the cylinders of a steam engine and has for its object the provision of a valve which is lighter in construction than valves of this type as heretofore constructed and hence a valve which induces less wear on the valve-gears, as well as less wear on the valve chamber bushing than is encountered with structures heretofore employed.

Another object of the invention is the provision of a valve wherein the valve head or ends consist of a single piece and the valve proper or body preferably comprises an integral structure; while the heads are provided with grooves adapted to receive complemental sectional rings, with certain of said rings consisting of a greater number of segments in order that the junctures between the respective segments of one ring section may not register with those of the segments of the other ring section.

The relation between the packing element and the heads is such that the packing elements will carry the load or weight and therefore the valve does not ride on the non-expansible bull-ring or follower portion of the head as in constructions heretofore employed.

The above enumerated objects and advantages, as well as other advantages inherent in the embodiments of the invention, will all be readily comprehended from the detailed description of the drawings, wherein:—

Figure 1 shows my improved valve in elevation.

Figure 2 is a cross sectional view taken substantially on the line 2—2 of Figure 1 as indicated by the arrows.

Figure 3 is a similar view taken substantially on the line 3—3 of Figure 1 as indicated by the arrows.

Figure 4 is a longitudinal sectional view taken on the line 4—4 of Figure 1.

Figure 5 is a detail sectional view of one of the valve heads showing a modified form of the head or end and the rings.

Figure 6 is a similar view illustrating another modification.

My invention, in its specific embodiment as disclosed in the first four figures of the drawings, comprises the intermediate tubular member 10 of predetermined length and diameter, and the head or end members 11 and 12; with the head member 12 adapted to receive the valve-stem or rod of which only a portion is shown at 13.

The tubular member 10 is in the nature of a straight cylinder shell preferably having threaded ends, as shown at 14 in Figure 4, adapted to screw into the threaded inner perimeters or hub portions of the head members 11 and 12 and then integrally secured thereto, for example by welding as shown at 15 in Figure 4.

The valve ends or head members 11 and 12 each consist of a single annular hollow member of predetermined diameter, with the outer periphery of each head of sufficient width and formed to provide a pair of annular channels 16, spaced apart longitudinally of each head and preferably rectangular in cross-section and of comparative depth as shown in Figure 4. The channels 16 are so spaced as to provide a comparative wide intermediate straight or bridge portion 17 to provide a bearing surface for certain portions of the composite sectional rings, as for example the inner or intermediate segments 18 in the structure shown in Figures 1 to 4.

In this exemplification of the invention, the portion 18 composed of a suitable number of segments, is shown in the nature of inverted channel members adapted to straddle the intermediate portion 17 of the outer peripheries of the heads or ends 11 and 12 of the valve as shown in Figure 4; with the sides thereof provided with the laterally and outwardly disposed flanges 19, 19, formed with straight or flat surfaces so as to seat in the bottoms of the annular channels 16 in the valve heads or ends. The side walls of the ring members 18 are spaced from the outer integral flange portions 20, 20 of the valve heads so as to receive the ring members or segments 21, 21, rectangular in cross-section and of vertical dimensions equal to the distance between the base or flange portions 19 and the outer faces of the segments 18 as shown in Figure 4; these segments being held in place by the intermediate segments 18 and the head flange 20.

The intermediate portions 17 of the valve heads or ends are shown provided with grooves 22. In the particular embodiment illustrated, each valve head or end is shown provided with a pair of parallelly arranged grooves 22, preferably arranged adjacent to the opposite sides of the segments 18, to receive suitable expander members or split rings 23, which normally tend to force the composite bull-rings outwardly into snug relation with the walls of the steam chamber or bushing. In practice, the segments 18 are preferably longer than the segments 21, as shown in Figure 2, thus providing a greater number of segments 21, with the result that the junctures between the respective segments 21 will not lap or come into alignment with the junctures between the segments 18 and hence a continuous steam gap or passage transversely of the valve heads or ends is prevented.

The valve head or end 12, which may be termed the inner end of the valve, is preferably provided with somewhat longer webs or radial ribs 24 by tapering or curving the same toward the opposite end or head of the valve, in order to provide a comparatively wide hub portion 25 at the longitudinal center line of the valve, as shown in Figure 4; while the webs or ribs 26 are shown of less width and tapering directly to the inner periphery of the valve head or end 11 so as to provide a sufficient threaded surface for attachment to the shell portion 10 of the valve.

With my improved integral valve structure, the valve-stem or rod 13 need not extend through the length of the valve as in constructions heretofore employed, but merely extends through the hub portion 25 at the inner end of the valve. As a means of securing the valve to the stem or rod 13, the outer end of the latter is shown enlarged at 27, see Figure 4, of transverse dimensions larger than the bore of hub portion 25, thus necessitating insertion of the opposite end of the stem or rod 13 through the hub 25 from the outer head or end 11 of the valve when assembling the device. The stem 13, adjacent to its hub receiving end, is shown threaded to receive a suitable nut 28 and lock-nut 29, whereby the hub 25 is firmly clamped between the enlaged end 27 of the stem and the nut 28. Any suitable type of lock-nut or suitable means may be employed for firmly holding nuts 28, 29 in place.

As previously stated, after the heads or ends 11 and 12 have been fully screwed onto the threaded ends of the tubular section or shell 10, the shell 10 and the two heads 11 and 12 are then formed into a unitary structure by welding as shown at 15. This integral structure therefore obviates the necessity of a long stem or rod extending entirely through the valve and hence materially reduces the weight of the valve, while at the same time eliminating possibility of play at the ends of the valve proper as may occur in steam valve constructions as heretofore employed.

As a result of my improved construction, a lighter valve is provided and hence less wear on the valve-gear and less wear on the valve chamber bushing is encountered as well as less wear on the weight supporting elements or packing elements of the valve results, and hence a longer lived valve is provided requiring less frequent renewal of the packing or bull-ring portion thereof.

In Figures 5 and 6 I illustrate modified forms of the packing elements or bull-ring and therefore a different placement of the expander elements. In Figure 5 a portion of one of the valve-heads or ends is shown at 30, with the outer perimeter provided with two parallelly arranged channels 31, which may be similar to the channels 16 shown in Figure 4 and adapted to receive the segmental packing elements 32 and 33, which, like in Figure 4, are preferably of different lengths so that the junctures of the segments 32 will not be aligned with the junctures of segments 33.

The segments 32 are shown L-shape in cross-section, with the base or bottom flange portion 34 seated on the bottoms of the channels 31 and disposed throughout the width of the channels; while the segments 33 are seated on the base or flange portions 34. The segments 32 are, of course, of greater vertical depth than the depth of the channels and the segments 33 at their outer perimeters are provided with the lateral flanges 35 disposed toward the center or intermediate portion of the valve-heads or ends and in overlapping and spaced relation with the outer periphery of the valve-head.

This causes the weight of the valve at the lower side, when the valve is arranged in a horizontal steam chamber, to be carried by the main body portion of the packing at the bottom of the channels. Where the valve is to be provided with the packing elements shown in Figure 5, I provide the bottoms of the channels 31 with circumferential grooves to receive the expanding means or split resilient rings 36 which normally tend to distend the packing segments into snug relation with the inner walls of the steam chamber or bushing therein.

In Figure 6 a portion of a valve-head or end is shown at 37, which may be substantially similar to the valve-heads or ends 11 and 12 of Figure 4 or the portion shown at 30 in Figure 5, and provided with the comparatively deep channels 38 arranged in parallel relation and each provided with the packing or bull-ring segments 39 and 40, which, like in the previously described constructions, are preferably of different lengths in order that the junctures of the element composed of segments 39 will not be in register with the juncture of the segments 40. The segments 40 are substantially identical with the segments 33, with peripheral flanges 41 arranged in overlapping relation with the outer periphery of the valve-head as shown.

The packing segments 39 are substantially Z-shape in cross-section; that is to say, the outer perimeters are provided with the laterally extending flange 42 disposed away from segments 40 and in overlapping relation with the circumferential ends of the valve-head; while the bottoms or inner perimeters of the segmental elements 39 are provided with the laterally extending flanges 43 so as to completely fill the bottoms of the channels and provide seats for the segments 40. The segments 39, like segments 32, are of greater depth than the depths of the channels in order that the metal heads of the valve may at no time contact with the valve chamber bushing.

In this modification of the invention, like in that shown in Figure 5, the bottoms of the channels 38 are shown provided with circumferential grooves for the reception of the expander means 36.

As shown in Figures 1 and 4, the opposing side walls 11ª and 12ª of the heads 11 and 12 slope outwardly toward the tubular intermediate section and so formed at the inner periphery thereof to provide a comparatively wide contacting bearing relation and juncture with the intermediate section 10 and thus permit of a sufficient number of threads on the inner peripheries, when this method of attachment is employed, and also provide a sufficient surface beyond at least a major portion of the threads so as to avoid possibility of injury to the threads during welding operation.

With my improved structure, wherein the ends or heads are each composed of a single piece member, it is apparent that the possibility of steam leaks through the head proper is entirely eliminated, which is not the case where the heads are of a composite nature as heretofore employed wherein leaks between the follower and the bull-ring and between the bull-ring and the spool and between the follower and the spool are possible particularly when the connections between the two followers or spiders become loose.

My invention is especially illustrated as a steam distribution valve, although equally applicable to other uses, and has been described in terms employed for purposes of description and not as terms of limitation, as modifications are possible without, however, departing from the spirit of my invention.

What I claim is:

1. In a device of the character described comprising a piston having a head provided with a pair of channels having a bridge portion therebetween; a segmental packing ring assemblage overlapping said bridge and normally seating on the bottoms of said channels; and an expander on said bridge beneath said assemblage.

2. In a device of the character described comprising a piston head provided with a pair of channels having a bridge portion therebetween; a segmental packing ring assemblage involving ring segments which straddle the bridge portion and normally seat on the bottoms of the channels and other ring segments supported by the first mentioned ring segments; and expander means on said bridge beneath the assemblage.

3. In a device of the character described comprising a piston having a head provided with channels separated by a bridge portion; a packing ring assemblage comprising a segmental packing ring straddling said bridge portion and normally seating on the bottom of said channels; other segmental rings in said channels and coacting with the bridge straddling ring; and expander means beneath the packing ring assemblage.

4. In a device of the character described comprising a piston having a head provided with channels separated by a bridge portion, a packing ring group comprising a segmental ring assemblage straddling said bridge portion and normally seating on the bottom of said channels, other segmental rings in said channels and coacting with the bridge straddling ring assemblage, and expander means beneath said packing ring assemblage.

HENRY E. MUCHNIC.